US011625403B2

(12) United States Patent
K N Sai Krishna et al.

(10) Patent No.: US 11,625,403 B2
(45) Date of Patent: Apr. 11, 2023

(54) QUERY PROCESSING USING A PREDICATE-OBJECT NAME CACHE

(71) Applicant: TERADATA US, INC., San Diego, CA (US)

(72) Inventors: Rangavajjula K N Sai Krishna, Andhra Pradesh (IN); Chandrasekhar Tekur, Hyderabad (IN); Bhashyam Ramesh, Secimderabad (IN)

(73) Assignee: Teradata US, Inc., San Diego, CA (US)

(*) Notice: Subject to any disclaimer, the term of this patent is extended or adjusted under 35 U.S.C. 154(b) by 153 days.

(21) Appl. No.: 17/084,979

(22) Filed: Oct. 30, 2020

(65) Prior Publication Data
US 2022/0138200 A1    May 5, 2022

(51) Int. Cl.
G06F 16/2455    (2019.01)
G06F 16/50    (2019.01)
G06F 16/25    (2019.01)
G06F 16/245    (2019.01)
G06F 9/50    (2006.01)
G06F 16/2453    (2019.01)

(52) U.S. Cl.
CPC ........ G06F 16/24552 (2019.01); G06F 9/505 (2013.01); G06F 16/24545 (2019.01); G06F 16/258 (2019.01)

(58) Field of Classification Search
CPC ......... G06F 16/24552; G06F 16/24545; G06F 16/258; G06F 9/505
See application file for complete search history.

(56) References Cited

U.S. PATENT DOCUMENTS

| | | | | |
|---|---|---|---|---|
| 7,945,577 | B2* | 5/2011 | Altinel | G06F 16/24552 |
| | | | | 707/769 |
| 10,860,562 | B1* | 12/2020 | Gupta | G06F 16/2453 |
| 2004/0225639 | A1* | 11/2004 | Jakobsson | G06F 16/24542 |
| 2008/0168071 | A1* | 7/2008 | Dykes | G06F 16/258 |
| 2008/0281857 | A1* | 11/2008 | Dymetman | G06F 16/81 |
| | | | | 707/999.102 |
| 2009/0254522 | A1* | 10/2009 | Chaudhuri | G06Q 30/0202 |
| 2011/0029507 | A1* | 2/2011 | Au | G06F 16/2456 |
| | | | | 707/E17.002 |

(Continued)

OTHER PUBLICATIONS

Keller, Arthur M., and Julie Basu. "A predicate-based caching scheme for client-server database architectures." The VLDB journal 5.1 (1996): 35-47. (Year: 1996).*

(Continued)

*Primary Examiner* — Mohsen Almani
(74) *Attorney, Agent, or Firm* — Trop, Pruner & Hu P.C.

(57) ABSTRACT

In some examples, a database system includes a memory to store a predicate-object name cache, where the predicate-object name cache contains predicates mapped to respective object names. The database system further includes at least one processor to receive a query containing a given predicate, identify, based on accessing the predicate-object name cache, one or more object names indicated by the predicate-object name cache as being relevant for the given predicate, retrieve one or more objects identified by the one or more object names from a remote data store, and process the query with respect to data records of the one or more objects retrieved from the remote data store.

19 Claims, 3 Drawing Sheets

(56) References Cited

U.S. PATENT DOCUMENTS

| | | | |
|---|---|---|---|
| 2013/0124500 A1* | 5/2013 | Beavin | G06F 16/24534 707/E17.017 |
| 2017/0103116 A1* | 4/2017 | Hu | G06F 16/2272 |
| 2017/0371924 A1* | 12/2017 | Ding | G06F 16/2228 |
| 2018/0260436 A1* | 9/2018 | Vanderpool | G06F 16/258 |
| 2020/0371800 A1* | 11/2020 | Chirca | G06F 9/325 |

OTHER PUBLICATIONS

Bharadwaj, Veeravalli, Debasish Ghose, and Thomas G. Robertazzi. "Divisible load theory: A new paradigm for load scheduling in distributed systems." Cluster Computing 6.1 (2003): 7-17. (Year: 2003).*

Jampa, Raj. "Storing and Indexing Expressions in Database Systems." (2006). (Year: 2006).*

Wikipedia, Microsoft Azure last edited Nov. 22, 2019 (8 pages).

Wikipedia, Materialized view last edited Sep. 5, 2019 (5 pages).

Wikipedia, Google Storage last edited Nov. 2, 2019 (2 pages).

Wikipedia, Amazon S3 last edited Nov. 26, 2019 (8 pages).

Koppuravuri et al., U.S. Appl. No. 16/724,724 entitled Using Materialized Views to Respond to Queries filed Dec. 23, 2019 (27 pages).

* cited by examiner

QUERY PROCESSING USING A PREDICATE-OBJECT NAME CACHE

BACKGROUND

A relational database management system (DBMS) stores databases that include collections of logically related data arranged in a predetermined format, such as in tables that contain rows and columns. To access the content of a table in a database, queries according to a standard database query language (such as the Structured Query Language or SQL) are submitted to the database. A query can also be issued to insert new entries into a table of a database (such as to insert a row into the table), modify the content of the table, or to delete entries from the table. Examples of SQL statements include INSERT, SELECT, UPDATE, and DELETE.

In other examples, object stores can be used to store objects that are usually larger in size than rows of a table in a relational DBMS. The object stores can be provided in a cloud that is accessible over a network, for example.

BRIEF DESCRIPTION OF THE DRAWINGS

Some implementations of the present disclosure are described with respect to the following figures.

Figure 1:
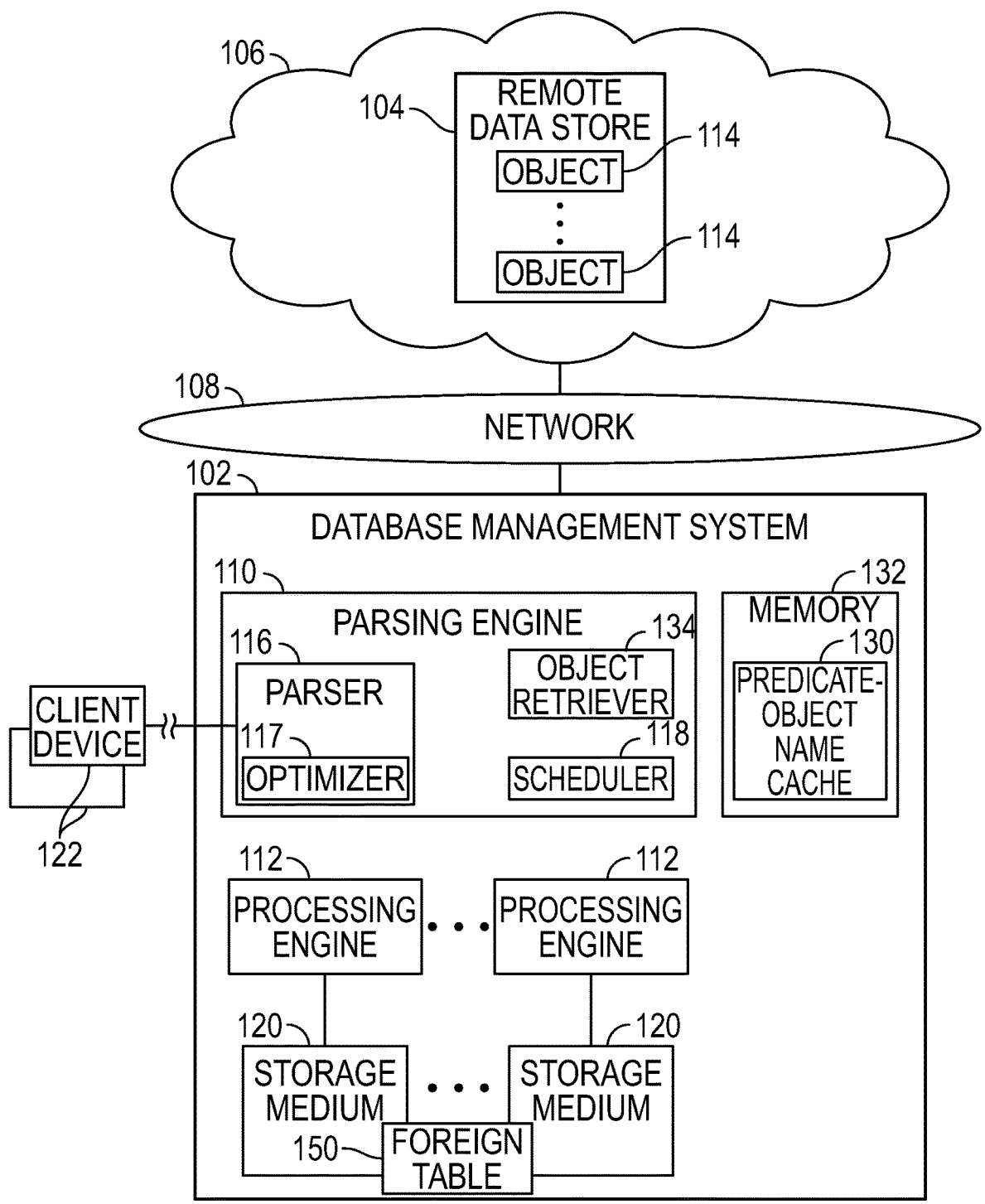
FIG. 1 is a block diagram of an example arrangement that includes a database management system and a remote data store, according to some implementations of the present disclosure.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an," or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

FIG. 1 is a block diagram of an example arrangement that includes a database management system (DBMS) 102 and a remote data store 104. In some examples, the remote data store 104 is an object store that stores objects 114. As used here, an "object" can refer to any separately identifiable or addressable unit of data.

In some examples, the remote data store 104 can be accessible in a cloud 106. A "cloud" can refer to any infrastructure, including computing, storage, and communication resources, that can be accessed remotely by user devices over a network, such as a network 108 shown in FIG. 1. Alternatively, the remote data store 104 can be provided in a data center or in any other computing environment.

The network 108 can include a public network (e.g., the Internet), a local area network (LAN), a wide area network (WAN), a wireless network (e.g., a wireless local area the network or WLAN, a cellular network, etc.), or any other type of network.

The DBMS 102 includes a parsing engine 110 that is able to process database queries, such as SQL queries, load requests, and so forth. SQL queries can include data definition language (DDL) statements and data manipulation language (DML) statements.

In addition to the parsing engine 110, the DBMS 102 includes multiple processing engines 112, in some examples. In other examples, the DBMS 102 can include just one processing engine 112.

As used here, an "engine" (e.g., the parsing engine 110 or a processing engine 112) can refer to a hardware processing circuit, which can include any or some combination of a microprocessor, a core of a multi-core microprocessor, a microcontroller, a programmable integrated circuit, a programmable gate array, a digital signal processor, or another hardware processing circuit. Alternatively, an "engine" can refer to a combination of a hardware processing circuit and machine-readable instructions (software and/or firmware) executable on the hardware processing circuit.

The multiple processing engines 112 are able to execute in parallel with one another, and are able to access, in parallel, different data portions (e.g., data records of different objects 114, data records of different portions of objects 114) of the remote data store 104. Each processing engine 112 is considered a Unit Of Parallelism (UOP) that is able to execute in parallel (e.g., concurrently or simultaneously) with one or more other UOPs. Each UOP is able to perform a local relational operation, such as a join operation (e.g., to join data from multiple tables), a data aggregation operation (to aggregate multiple pieces of data into an aggregate value, such as a sum, maximum, minimum, average, median, etc.), an ordered analytic operation, and so forth. An ordered analytic operation refers to an operation that has an order specification (specifying an order based on one or more attributes, e.g., sorting based on the one or more attributes) or an expression that performs some predetermined analysis, such as ranking, computing a moving average within a window size, calculating a cumulative total, calculating a percentile, and so forth.

As used here, a "data record" can refer to any unit of data that can be processed by the DBMS 102. For example, the data record can be in the form of a row of a table, a table, a materialized view, or any other piece of data. Each data record can have multiple attributes. In a table row, the multiple attributes can be the multiple columns of the table row. Each attribute is assigned a value in the corresponding data record.

Traditionally, a DBMS stores data in relational databases stored in a block-based storage, in which data is stored as blocks that are smaller in size than objects of object stores. For example, a block-based storage can include disk-based storage devices, solid state storage devices, and so forth. The block-based storage can be connected to the DBMS over a relatively high-speed link, such that the DBMS can access (read or write) data in a relational database with relatively low input/output (I/O) latency (i.e., the delay between a time that a request is submitted and a time that the request is satisfied at the storage is relatively low). The block-based storage can be considered a local storage of the DBMS, since the DBMS is able to access the block-based storage with relatively low I/O latency.

In some examples, instead of coupling block-based storage to the DBMS 102, the DBMS 102 can work with just the remote data store 104, which can be provided in the cloud 106 or another remote computing environment. In such examples, local block-based storage is not used with the DBMS 102 to store relational tables. The objects 114 of the remote data store 104 can have variable sizes, and each object can have a size between 10 megabytes (MB) and 100 MB. In other examples, an object can have a smaller or larger size. An object in an object store is typically larger in size than data records (e.g., rows, tables, etc.) stored in a local block-based storage.

When responding to a database query (or more simply, a "query"), the DBMS 102 can access (write or read) data of the remote data store 104, rather than data in a relational table (or relational tables) of a local block-based storage.

When processing a query on data in the remote data store 104, the DBMS 102 may fetch all of the objects from an external location (specified by the query) at the remote data store 104. For example, the external location can include a bucket or a container that includes objects that are the target of a query. The remote data store 104 is be divided into buckets or containers, where each bucket or container can include one or more objects 114. Generally, a "bucket" or "container" can refer to a data structure (analogous to a directory) that can contain further data, such as the objects 114.

In other examples, the remote data store 104 is not divided into buckets or containers.

Objects fetched from the remote data store 104 are distributed across the processing engines 112 of the DBMS 102, for load-balancing to distribute the processing load across the processing engines 112. Additionally, the objects 114 fetched from the remote data store 104 are sharded, which converts the objects 114 into a format that can be processed at the DBMS 102. For example, the objects can be converted into data records that can be in the form of rows and/or tables of a relational database.

Each processing engine 112 then applies a predicate in the query to the data records produced by the sharding. A "predicate" refers to a condition specified in the query that is used to select data records from a larger collection of data records. Data records that match the predicate of the query are processed to produce an output for the query. For example, a predicate can be in the form of "WHERE T1.x=5," which selects data records having an attribute (column) x with the value 5. Data records having the attribute x not equal to 5 are not selected for the query.

Note that even though all of the objects 114 of the remote data store 104 (or specific one or more locations, such as buckets or containers, of the remote data store 104) are retrieved to the DBMS 102 for processing with respect to the query, only a percentage of the objects 114 fetched may satisfy the query predicate. If there are a large number of objects 114 retrieved from the remote data store 104 (e.g., hundreds of thousands to millions of objects), then the retrieval of such a large number of objects 114 from the remote data store 104 by the DBMS 102 can be time-consuming, and can consume a large amount of processing, storage, and network resources. For example, if just 1% of the retrieved objects 114 satisfy the query predicate, then that means that 99% of the retrieved objects 114 would have been unnecessarily retrieved from the remote data store 104.

In addition, the retrieved objects 114 distributed across the processing engines 112 may not evenly satisfy the query predicate; in other words, a first quantity of objects 114 at a first processing engine 112 that satisfy the query predicate may be much different (much larger or much smaller) from a second quantity of objects 114 at a second processing engine 112 satisfying the query predicate. As a result, even though the quantities of objects 114 distributed across the processing engines 112 may be approximately even, the processing workloads across the processing engines 112 may be skewed (i.e., some processing engines 112 may process data records of a larger quantity of objects 114 than other processing engines 112). In a more specific example, the quantity of data records of objects 114 at a first processing engine 112 that satisfy the query predicate may be a small number, while the quantity of data records of objects 114 at a second processing engine 112 that satisfy the query predicate may be a large number. In this example, the second processing engine 112 will have a much heavier workload than the first processing engine 112 because the second processing engine 112 has more data records to process (e.g., join, merge, etc.).

Table 1 below shows an example of a quantity of objects retrieved from the remote data store 104 that contribute to a query result at each of processing engines 1, 2, 3, and 4, i.e., the quantity of objects with data records that satisfy the query predicate.

TABLE 1

| Processing engine | Quantity of objects contributing to the query result |
|---|---|
| 1 | 0 |
| 2 | 400 |
| 3 | 100 |
| 4 | 500 |

Assume also that the quantity of objects 114 retrieved from the remote data store 104 is 1,000,000, which means that 250,000 objects will be distributed to each of the four processing engines 1, 2, 3, and 4.

Note that of the 250,000 objects at each processing engine, only a very small fraction (1,000 objects in total) contributes to the query result, which means that a large portion of the objects (999,000 objects) were retrieved from the remote data store 104 unnecessarily (i.e., this large portion does not contribute to the query result). Also, the workload across the processing engines 1, 2, 3, and 4 is uneven, since processing engine 1 has zero objects that contribute to the query result, while processing engine 4 has 500 objects that contribute to the query result.

If the same query or another query with the same predicate as a previously submitted query were to be received by the DBMS 102, then the above process would be performed again to retrieve all objects from specified one or more locations of the remote data store 104 into the DBMS 102 and distribute across the processing engines 112 for processing.

In accordance with some implementations of the present disclosure, to improve the performance in processing queries against objects 114 stored in the remote data store 104, a predicate-object name cache 130 is stored in a memory 132 of the DBMS 102. The memory 132 can be implemented using a memory device or a collection of memory devices. Examples of memory devices include any or some combination of the following: a dynamic random access memory (DRAM) device, a static random access memory (SRAM) device, a flash memory device, an electrically erasable or programmable read-only memory (EEPROM), and so forth.

The predicate-object name cache 130 contains mapping information that maps query predicates to respective object names. An "object name" refers to a name of an object 114 in the remote data store 104. A "name" can include an identifier, in the form of a string, a uniform resource locator (URL), an alphanumeric string, or any other information that can uniquely identify a respective object 114.

In the predicate-object name cache 130, each query predicate is mapped to one or more object names, which are names of objects that are relevant for the query predicate. An object is relevant to a query predicate if the data records of the object satisfy the query predicate. In some examples, the predicate-object name cache 130 includes multiple entries, where each entry contains a corresponding query predicate and one or more object names that are associated with the corresponding query predicate. A query predicate in a received query is used as an index to an entry of the predicate-object name cache 130. Note that the predicate-object name cache 130 stores object names, but not the objects (or data of the objects) themselves.

In further examples, each entry of the predicate-object name cache 130 can correlate a combination of a query predicate and a location (e.g., a bucket, a container, etc.) of the remote data store 104 with one or more object names. Thus, in such examples, an entry is retrieved from the predicate-object name cache 130 using a query predicate and a location specified in a received query as an index.

In some examples, the entries of the predicate-object name cache 130 are key-value pairs, where a key includes a query predicate or a combination of a query predicate and a location of the remote data store 104, and a value includes one or more object names associated with the key. In further examples, the value of a key-value pair can further include additional metadata of each object identified in the key-value pair, where the additional metadata can include a size of an object, a count of a quantity of data records in an object, or other metadata. Such metadata can be provided to an optimizer 117 of the parsing engine 110 for use in developing a query plan for the received query.

By storing the predicate-object name cache 130 in the memory 132, the DBMS 102 is able to use the information in the predicate-object name cache 130 to determine which objects 114 in the remote data store 104 are relevant for a predicate in a query received by the DBMS 102. For example, if the DBMS 102 receives a query that has a given predicate, an object retriever 134 in the parsing engine 110 can access the predicate-object name cache 130 to determine which one or more objects 114 (identified by one or more object names corresponding to the given predicate in the predicate-object name cache 130) in the remote data store 104 are relevant for the given predicate. The object retriever 134 can be part of the hardware processing circuit of the parsing engine 110, or can include machine-readable instructions executable on the parsing engine 110. In other examples, the object retriever 134 can be separate from the parsing engine 110.

In examples where a received query contains multiple predicates, then the object retriever 134 can identify, based on accessing the predicate-object name cache 130, the objects that are relevant for the multiple predicates. For example, the object retriever 134 can access multiple entries of the predicate-object name cache 130 that contain the multiple predicates, and obtain the object names of objects 114 that are relevant for the multiple predicates in the multiple entries. If a query involves multiple predicates, predicates for the query itself and predicates for a subquery, or join predicates apart from query predicates, etc., the object names filtered as part of each predicate can be stored in the predicate-object name cache 130.

The identified one or more objects 114 (as identified by one or more object names obtained from the predicate-object name cache 130 based on the received query) are retrieved by the object retriever 134 from the remote data store 104. These retrieved objects 114 are then distributed evenly across the processing engines 112.

In the example of Table 1 above, instead of retrieving 1,000,000 objects from the remote data store 104, only 1,000 objects are retrieved by the object retriever 134. Also, these 1,000 objects (that contribute to the query result because they satisfy the query predicate) are evenly distributed across the processing engines 1, 2, 3, and 4 of Table 1 (i.e., each processing engine receives 250 objects for processing).

The parsing engine 110 of the DBMS 102 can include a parser 116 and a scheduler 118. The parser 116 or scheduler 118 can be part of the hardware processing circuit of the parsing engine 110, or can include machine-readable instructions executable on the parsing engine 110.

The parser 116 receives database queries (such as SQL queries, load requests, etc.) submitted by one or more client devices 122, which may be coupled to the DBMS 102 over an interconnect (e.g., the network 108 or another link). The parser 116 parses each received database query, and generates executable steps for the parsed query. The parser 116 includes the optimizer 117 that generates multiple query plans in response to a query (which may consider metadata included in the predicate-object name cache 130 in some examples). The optimizer 117 selects the most efficient query plan from among the multiple query plans. Each query plan includes a sequence of executable steps to perform to process the database query. The scheduler 118 sends the executable steps of the selected query plan to respective processing engines 112. Note that the executable steps sent to the respective processing engines 112 specifies how objects 114 retrieved from the remote data store 104 are distributed across the processing engines 112.

Each processing engine 112 can perform the following tasks: inserts, deletes, or modifies contents of tables or other data records; creates, modifies, or deletes definitions of tables or other data records; retrieves information from definitions and tables or other data records; locks databases and tables or other data records; and so forth.

The DBMS 102 is able to access the remote data store 104 using a foreign table 150. The foreign table 150 stores information identifying the location of the remote data store 104. The foreign table 150 does not include the actual data of each object 114, such that the foreign table 150 is much smaller in size than the collection of the objects 114 in the data store 104.

In examples where there are multiple processing engines 112, the foreign table 150 can be distributed across respective storage media 120 that are associated with the corresponding processing engines 112. Each storage medium 120 is associated with a respective processing engine 112, such that the processing engine 112 is able to manage access of data in the associated storage medium 120. The storage medium 120 can refer to a physical storage device (or group of physical storage devices) or to a logical storage device.

In an example, a SQL statement to create a foreign table RWebLog is as follows:

```
CREATE FOREIGN TABLE RWebLog
USING
( LOCATION ('/R/rweb.teradata.com/mybucket/data')
PATHPATTERN ($Root/$ServerID/$LogDate);
```

In the foregoing example SQL statement, LOCATION and PATHPATTERN are table-level properties. The LOCATION property includes the reference '/R/rweb.teradata.com/mybucket/data' that identifies the location of the remote data store 104.

Although a specific example foreign table with specific properties is provided above, a foreign table may have other properties in other examples.

In the example shown above, the PATHPATTERN property includes a path pattern that is used to filter object names before fetching the actual data from an object. The path pattern can represent a logical directory structure for the objects 114 in the remote data store 104. For example, consider an object named as "us/1001/12-12-2012"; in this example, $LogDate has a value 12-12-2012, which is the date that the object having the name "us/1001/12-12-2012" was added to the data store 104. $Root can indicate a country name, and $ServerID includes an identifier of a server from which log data is retrieved.

Figure 2:
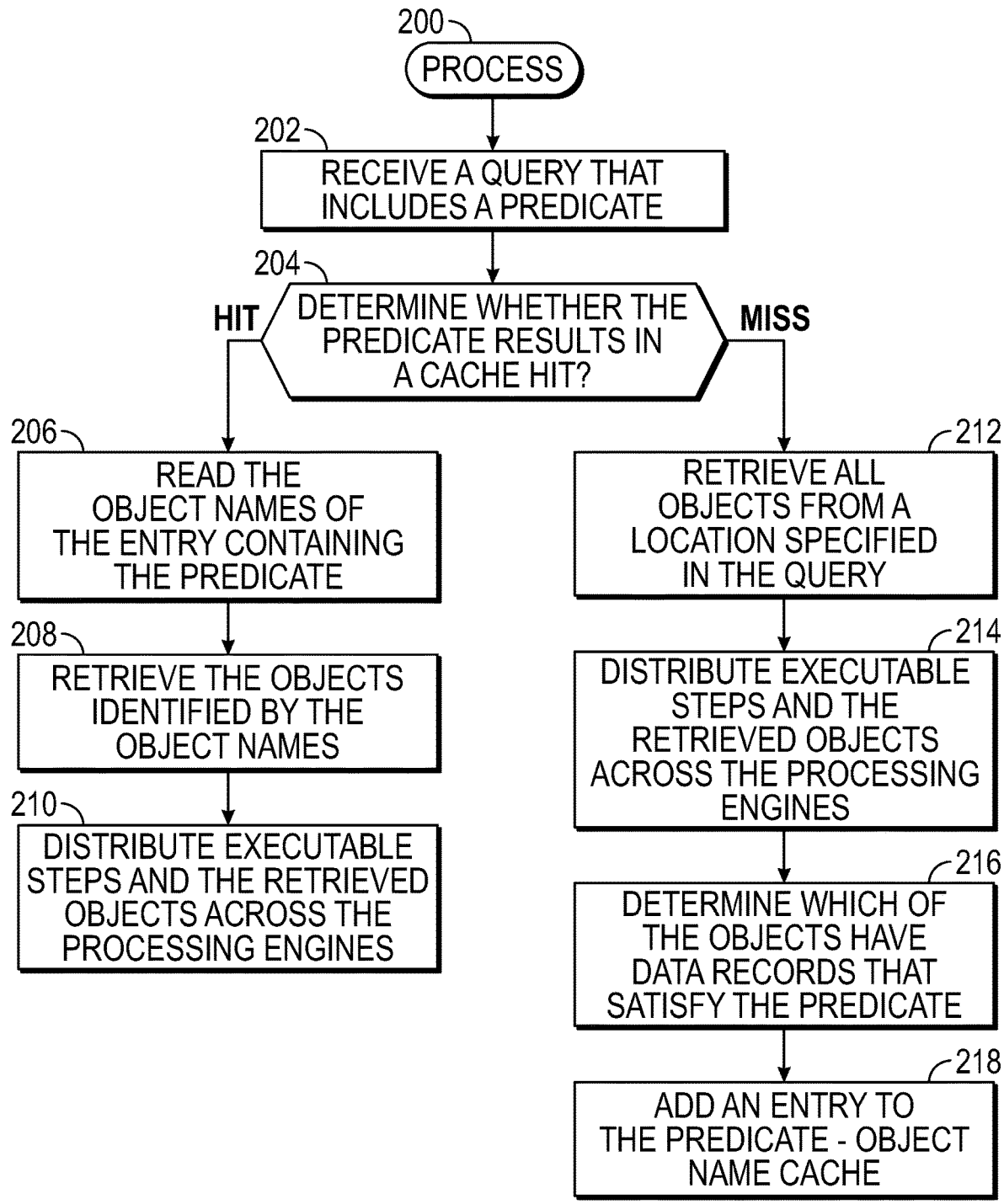
FIG. 2 is a flow diagram of an example process according to some implementations of the present disclosure.

FIG. 2 is a flow diagram of a process 200 according to some examples, which may be performed by the DBMS 102 of FIG. 1. The parsing engine 110 receives (at 202) a query that includes a predicate. As used here, "a predicate" can refer to a single predicate or multiple predicates contained in the query.

The object retriever 134 determines (at 204) whether the predicate in the received query results in a cache hit in the predicate-object name cache 130 (i.e., the predicate in the received query is in an entry of the predicate-object name cache 130).

If a cache hit, then the object retriever 134 reads (at 206) the object names of the entry that contains the predicate in the received query. The object retriever 134 retrieves (at 208), over the network, the objects 114 identified by the one or more object names from the remote data store 104.

After the optimizer 117 of the parsing engine 100 generates a query plan containing executable steps for the received query, the scheduler 118 distributes (at 210) the executable steps and the retrieved objects 114 across the processing engines 112.

However, if the object retriever 134 determines (at 204) that the predicate in the received query results in a cache miss in the predicate-object name cache 130 (i.e., the predicate in the received query is not in any of the entries of the predicate-object name cache 130), then the object retriever 134 retrieves (at 212) all objects 114 from a location of the remote data store 104 specified in the received query.

Such objects along with executable steps of a query plan generated by the optimizer 117 are distributed (at 214) across the processing engines 112. The object retriever 134 determines (at 216) which of the objects 114 (all objects retrieved from the specified location of the remote data store 104) have data records that satisfy the predicate of the received query. In addition, the object retriever 134 adds (at 218) an entry to the predicate-object name cache 130, where the added entry contains the predicate along with one or more object names of the object(s) 114 that satisfy the predicate.

Once the added entry is in the predicate-object name cache 130, this added entry is available when processing a subsequently received query that contains a matching predicate. Cache hit can occur if the predicate of the query is the same as or is a subset of a predicate in the predicate-object name cache 130.

In further examples, a cache hit or cache miss can be determined based on whether a combination of the predicate and a location specified by the received query is in the predicate-object name cache 130.

In some examples, the object names identified in the predicate-object name cache 130 are not tied to any specific user, session, or table. In other words, the predicate-object name cache 130 can be used for queries submitted by different users (e.g., different human users, different application programs or other entities), can be used for queries in different sessions established by client device(s) 122 with the DBMS 102, and/or with different tables.

The cached object names in the predicate-object name cache 130 may become stale with respect to the objects 114 stored in the remote data store 104, such as due to object modifications. Object modifications can include any or some combination of the following: an object update, in which existing data record(s) of an existing object in the remote data store 104 is updated; an object deletion, in which an existing object in the remote data store 104 is deleted; and an object insertion, in which a new object is inserted in the remote data store 104. Note that an object insertion also includes the case where a new data record is inserted into an existing object in the remote data store 104.

For object deletions, if a cache hit results in the predicate-object name cache 130 and the object retriever 134 attempts to retrieve an object that has already been deleted at the remote data store 104, fetching of this deleted object can be skipped.

For object updates or object insertions, the parsing engine 110 can maintain locally a list of object names of updated objects (containing updated data records or newly added data records) and newly inserted objects. In some examples, the parsing engine 110 can register for cloud notifications with the remote data store 104 for a notification of any object updates or object insertions. When the remote data store 104 inserts a new object or updates an existing object, the remote data store 104 can send a notification of an object name of the new/existing object to the parsing engine 110, which then adds the object name to the list of object names of newly inserted objects and of updated existing objects.

For a received query, the object retriever 134 obtains the objects identified in the list in addition to any objects identified by an entry of the predicate-object name cache 130 corresponding to the predicate of the received query.

For each object identified by the list, the object retriever 134 can determine whether the object satisfies the predicate of the received query, and, if so, the object retriever 134 can add an object name of the object to the corresponding entry of the predicate-object name cache 130 (if not already present).

In some examples, the DBMS 102 can store a configuration setting that can be modified by a user of the DBMS 102 to specify whether or not metadata for a given query or given session is to be maintained in the predicate-object name cache 130. For example, the configuration setting can be set to a first value to indicate that the predicate-object name cache 130 is to be maintained for a given query or session, and the configuration setting can be set to a different second value to indicate that the predicate-object name cache 130 is not to be maintained for a given query or session.

Note that the predicate-object name cache 130 can be used in (1) a DBMS with a data cache, or (2) a DBMS without a data cache. A data cache stores data records of objects retrieved from the remote data store 104. The predicate-object name cache 130 can be used in a DBMS with a data cache to reduce the quantity of objects retrieved into the data cache (i.e., the objects retrieved into the data cache are those that the predicate-object name cache 130 indicates are relevant to a predicate of a query).

Figure 3:
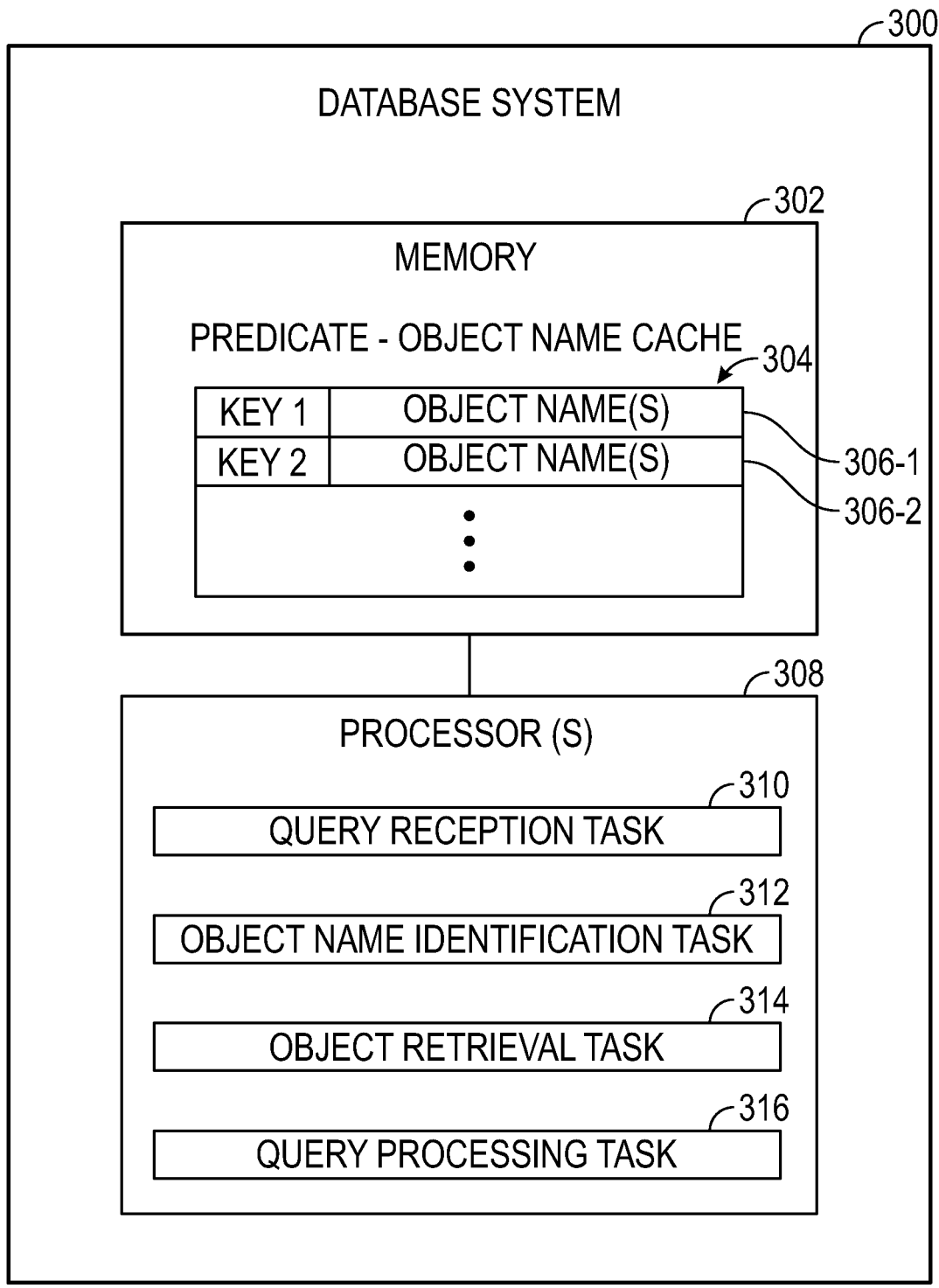
FIG. 3 is a block diagram of an example database system according to some implementations of the present disclosure.

FIG. 3 is a block diagram of a database system 300 that includes a memory 302 to store a predicate-object name cache 304, where the predicate-object name cache 304 contains entries 306-1, 306-2, and so forth. Each entry 306-$i$ ($i=1, 2, \ldots$) maps a respective key (KEY 1, KEY 2, etc., shown in FIG. 3) to respective one or more object names. A key can contain a query predicate, or alternatively, a combination of a remote data store location and a query predicate.

The database system 300 includes one or more hardware processors 308 to perform various tasks. A hardware processor can include a microprocessor, a core of a multi-core microprocessor, a microcontroller, a programmable integrated circuit, a programmable gate array, or another hardware processing circuit.

The tasks can be performed based on machine-readable instructions executed on the one or more hardware processors 308. The machine-readable instructions can be stored in a non-transitory machine-readable or computer-readable storage medium.

The tasks include a query reception task 310 to receive a query containing a given predicate.

The tasks include an object name identification task 312 to identify, based on accessing the predicate-object name cache 304 in the memory 302, one or more object names indicated by the predicate-object name cache 304 as being relevant for the given predicate.

The tasks include an object retrieval task 314 to retrieve one or more objects identified by the one or more object names from a remote data store (e.g., 104 in FIG. 1).

The tasks include a query processing task 316 to process the query with respect to data records of the one or more objects retrieved from the remote data store.

A storage medium can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory or other type of non-volatile memory device; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A database system comprising:
   a memory to store a predicate-object name cache, the predicate-object name cache containing a plurality of entries that map predicates to respective object names, wherein the plurality of entries comprise a first entry that maps a first predicate to a plurality of object names, and a second entry that maps a second predicate to one or more object names, wherein the second predicate is different from the first predicate, wherein the first entry further comprises first metadata for each object identified by the plurality of object names in the first entry, the first metadata including a count of a respective quantity of data records in each object identified by the plurality of object names, and wherein the second entry further comprises second metadata for each object identified by the one or more object names in the second entry, the second metadata including a count of a respective quantity of data records in each object identified by the one or more object names; and
   at least one processor to:
   receive a query containing a given predicate;
   use the given predicate as an index to the first entry of the plurality of entries of the predicate-object name cache, wherein different predicates index to different entries of the plurality of entries;
   responsive to indexing to the first entry using the given predicate, retrieve the plurality of object names from the first entry that identify objects that are relevant for the given predicate;
   retrieve the objects identified by the plurality of object names from a remote data store; and
   process the query with respect to data records of the objects retrieved from the remote data store.

2. The database system of claim 1, further comprising:
   a plurality of processing engines,
   wherein the at least one processor is to distribute the objects retrieved from the remote data store across the plurality of processing engines.

3. The database system of claim 2, wherein each respective processing engine of the plurality of processing engines is to apply the given predicate with respect to data records of a respective subset of the objects distributed to the respective processing engine.

4. The database system of claim 1, wherein the first entry maps a combination of the first predicate and a first bucket to the plurality of object names, and the second entry maps a combination of the second predicate and a second bucket to the one or more object names, wherein the first bucket comprises the objects identified by the plurality of object names, and the second bucket comprises one or more objects identified by the one or more object names.

5. The database system of claim 1, wherein the at least one processor is to convert the objects retrieved from the remote data store into data records according to a format for the database system.

6. The database system of claim 1, wherein the predicate-object name cache stores respective object names without storing data of objects identified by the respective object names.

7. The database system of claim 1, wherein the at least one processor is to further:
   receive a further query containing a further predicate;
   determine that the further predicate is not in the predicate-object name cache; and
   in response to determining that the further predicate is not in the predicate-object name cache, add an entry comprising the further predicate and corresponding one or more object names relevant for the further predicate to the predicate-object name cache.

8. The database system of claim 7, wherein the at least one processor is to further:
in response to determining that the further predicate is not in the predicate-object name cache:
retrieve further objects from a location of the remote data store, and
determine a subset of the further objects associated with data records that satisfy the further predicate,
wherein the entry added to the predicate-object name cache contains object names identifying objects in the subset of the further objects.

9. The database system of claim 1, wherein the plurality of entries of the predicate-object name cache comprise key-value pairs, each respective key-value pair of the key-value pairs comprising a key that comprises a respective predicate, and a value that comprises one or more object names.

10. The database system of claim 1, wherein the at least one processor is to further:
determine new objects added to the remote data store, the new objects not represented in the predicate-object name cache;
receive a further query containing the given predicate;
identify, based on accessing the predicate-object name cache, the plurality of object names indicated by the first entry of the predicate-object name cache as being relevant for the given predicate;
retrieve the new objects from the remote data store; and
process the further query with respect to data records of the new objects and the objects identified by the plurality of object names.

11. The database system of claim 10, wherein the at least one processor is to further:
register for a cloud notification and automatically maintain locally a list of the new objects added to the remote data store.

12. The database system of claim 10, wherein the at least one processor is to:
based on the processing of the further query:
identify one or more new objects of the new objects that are associated with data records that satisfy the given predicate, and
add one or more object names of the one or more new objects to the first entry, in the predicate-object name cache, corresponding to the given predicate.

13. The database system of claim 1, wherein the given predicate is the same as or is a subset of the first predicate in the first entry of the predicate-object name cache.

14. A non-transitory machine-readable storage medium comprising instructions that upon execution cause a database system to:
store, in a memory, a predicate-object name cache, the predicate-object name cache containing a plurality of entries that map query predicates to respective object names, wherein the plurality of entries comprise a first entry that maps a first query predicate to a plurality of object names, and a second entry that maps a second query predicate to one or more object names, wherein the second query predicate is different from the first query predicate, wherein the first entry further comprises first metadata for each object identified by the plurality of object names in the first entry, the first metadata including a count of a respective quantity of data records in each object identified by the plurality of object names, and wherein the second entry further comprises second metadata for each object identified by the one or more object names in the second entry, the second metadata including a count of a respective quantity of data records in each object identified by the one or more object names;
receive a query containing a given query predicate;
determine whether the given query predicate is present in the predicate-object name cache by using the given query predicate as an index to the predicate-object name cache, wherein different query predicates index to different entries of the plurality of entries; and
in response to determining that the given query predicate is present in the predicate-object name cache based on determining that the given query predicate indexes to the first entry of the predicate-object name cache:
retrieve the plurality of object names from the first entry that identify objects that are relevant for the given query predicate,
retrieve the objects identified by the plurality of object names from a remote data store, and
process the query with respect to data records of the objects retrieved from the remote data store.

15. The non-transitory machine-readable storage medium of claim 14, wherein the instructions upon execution cause the database system to:
in response to determining that the given query predicate is not present in the predicate-object name cache:
retrieve all objects from a location, in the remote data store, specified in the query,
update the predicate-object name cache based on processing of the objects from the location.

16. The non-transitory machine-readable storage medium of claim 15, wherein the updating of the predicate-object name cache comprises adding an object name of a given object from the location to an entry, corresponding to the given query predicate, of the predicate-object name cache, where the given object contains data records that satisfy the given query predicate.

17. The non-transitory machine-readable storage medium of claim 14, wherein the predicate-object name cache comprises key-value pairs, each respective key-value pair of the key-value pairs comprising a key that is a combination of a location in the remote data store and a query predicate, and a value that comprises one or more object names.

18. The non-transitory machine-readable storage medium of claim 14, wherein the database system comprises a data cache to store data of objects from the remote data store, and wherein the instructions upon execution cause the database system to:
use the predicate-object name cache to select objects for which data is to be retrieved into the data cache.

19. A method of a database system comprising a hardware processor, comprising:
storing, in a memory, a predicate-object name cache, the predicate-object name cache containing a plurality of key-value pairs, each key-value pair of the plurality of key-value pairs comprising a key comprising a query predicate and a value comprising one or more object names associated with the query predicate, wherein the plurality of key-value pairs comprise a first key-value pair that maps a first query predicate to a plurality of object names, and a second key-value pair that maps a second query predicate to one or more object names, wherein the second query predicate is different from the first query predicate, wherein the first key-value pair further comprises first metadata for each object identified by the plurality of object names in the first key-value pair, the first metadata including a count of a respective quantity of data records in each object identified by the plurality of object names, and wherein the second key-value pair further comprises second metadata for each object identified by the one or more object names in the second key-value pair, the second metadata including a count of a respective quantity of data records in each object identified by the one or more object names;

receiving a query containing a given query predicate;

determining whether the given query predicate is present in the predicate-object name cache by using the given query predicate as an index to the predicate-object name cache, wherein different query predicates index to different key-value pairs of the plurality of key-value pairs; and in response to determining that the given query predicate is present in the predicate-object name cache based on determining that the given query predicate indexes to the first key-value pair of the predicate-object name cache:

retrieving the plurality of object names from the first key-value pair that identify objects that are relevant for the given query predicate, retrieving the objects identified by the plurality of object names from a remote data store, and processing the query with respect to data records of the objects retrieved from the remote data store.

\* \* \* \* \*